(12) United States Patent
Dahl

(10) Patent No.: US 6,293,225 B1
(45) Date of Patent: Sep. 25, 2001

(54) AUTOMATIC FEEDING DEVICE

(76) Inventor: Christian Dahl, Schlossberg 1C, Niehuus, D-24955 Harrislee (DE)

( * ) Notice: Subject to any disclaimer, the term of this patent is extended or adjusted under 35 U.S.C. 154(b) by 0 days.

(21) Appl. No.: 09/463,964

(22) PCT Filed: Aug. 11, 1997

(86) PCT No.: PCT/DK97/00329

§ 371 Date: May 11, 2000

§ 102(e) Date: May 11, 2000

(87) PCT Pub. No.: WO99/07214

PCT Pub. Date: Feb. 18, 1999

(51) Int. Cl.[7] ............................... A01K 5/00; A01K 5/02; B65D 47/08

(52) U.S. Cl. .................... 119/54; 119/52.4; 222/547; 222/564

(58) Field of Search ................... D30/121, 122; 119/54, 52.4; 222/544, 547, 564

(56) References Cited

U.S. PATENT DOCUMENTS

| 2,787,404 | * | 2/1957 | Vandenberg et al. | 222/428 |
|---|---|---|---|---|
| 3,722,761 | | 3/1973 | Icking et al. | 222/409 |
| 4,377,130 | * | 3/1983 | Schwieger | 119/51.5 |
| 4,399,931 | * | 8/1983 | Maddalena | 222/282 |
| 4,825,811 | * | 5/1989 | O'Kelly | 119/51.5 |
| 4,829,935 | * | 5/1989 | Gray | 119/54 |
| 4,895,109 | * | 1/1990 | De Groot et al. | 119/51.5 |
| 5,146,872 | | 9/1992 | Waldner | 119/54 |
| 5,272,998 | * | 12/1993 | Pannier et al. | 119/53.5 |
| 5,365,879 | * | 11/1994 | Ying-Kuan | 119/54 |

FOREIGN PATENT DOCUMENTS 343703  2/1960 (CH).

* cited by examiner

Primary Examiner—Charles T. Jordan
Assistant Examiner—Kimberly S Smith
(74) Attorney, Agent, or Firm—Dennison, Scheiner, Schultz & Wakeman

(57) ABSTRACT

An automatic dispenser capable of delivering accurate quantities of fodder and minimizing waste is disclosed, which dispenser includes a closing mechanism having a plate that scrapes against a wall of the dispenser as the closing mechanism is actuated to reduce the build-up of fodder on the wall of the dispenser.

11 Claims, 11 Drawing Sheets

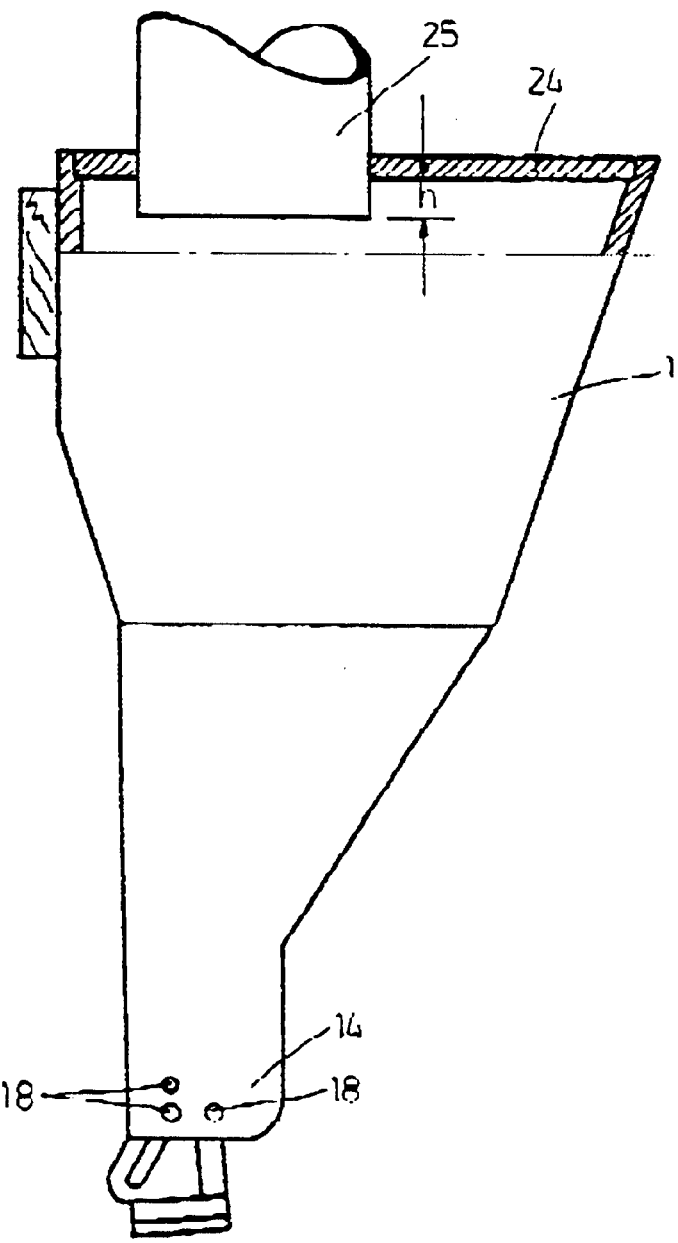
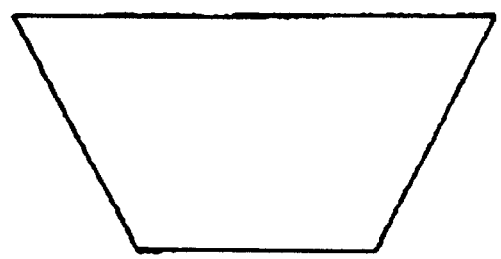
FIG. 8

AUTOMATIC FEEDING DEVICE

BACKGROUND OF THE INVENTION

The present invention relates to an automatic dispenser, primarily for the dispensing of fodder, comprising a receptacle having an outlet opening at the bottom, and a closing mechanism which can be activated from the outside, for example by an animal.

Such a dispenser is known from GB patent application No. 2 283 897.

This known automatic dispenser has the drawback that a bridging effect easily occurs in the material to be dispensed between the internal walls of the receptacle. The automatic dispenser is thus not self-discharging. Furthermore, it cannot dispense in the desired quantities, it takes up a lot of space in an animal's feeding trough, and it is not service-friendly.

Another automatic dispenser is known from EP patent application No. 0 469 192 where the closing mechanism consists of two "inverted" cones mutually connected by a rod. This closing mechanism can be moved into all possible oblique directions, it presents the risk that it will get stuck in the open position, and it cannot dispense accurately. Only fodder positioned directly over the closing mechanism will be dispensed. The remaining fodder will therefore become old and thicken in the receptacle, where it will be the cause of bridge formation.

SUMMARY OF THE INVENTION

It is the purpose of the present invention to describe an automatic dispenser without the drawbacks of the known automatic dispenser.

This can be achieved by giving the automatic dispenser a shape as stated in the characterizing part of claim 1.

The automatic dispenser according to the invention delivers smaller quantities than the known dispensers, and therefore has less waste. When the closing mechanism moves upwards there is a scraping action along the back wall of the receptacle, and the fodder moves in the direction from the receptacle's back wall towards the front wall. It is thus always the lowest fodder in the receptacle that is dispensed.

The fodder is set in motion so that there will be no bridging in the receptacle, and fodder will not come out until the animal releases the closing mechanism. The dispensed quantity is very accurate, and there is no waste.

Claim 2 deals with a special embodiment of the lowest part of a receptacle for an automatic dispenser according to the invention.

The embodiment according to claim 3 ensures that the lowest part of an automatic dispenser according to the invention takes up the least possible space.

Claim 4 deals with a preferred embodiment of a closing mechanism for an automatic dispenser according to the invention.

The arrangement described in claim 5 ensures that the closing mechanism closes the outlet opening in both the lowest and the highest position.

Claim 6 describes how the dispenses quantity can be adjusted.

Claim 7 describes how an air cushion can be formed at the top of the receptacle. The pressure on the closing mechanism will thereby be lower so that less force is needed to raise the closing mechanism.

The invention is explained in detail below with reference to the drawing in which

BRIEF DESCRIPTION OF THE DRAWINGS

FIG. 8 is a smaller scale view of a partial section through an automatic dispenser according to the invention, and a belonging trough.

DETAILED DESCRIPTION OF THE INVENTION

An automatic dispenser consists of a receptacle 1, which at the bottom has an outlet opening 2 and a closing mechanism 3, which can be activated from the outside.

Figure 1:
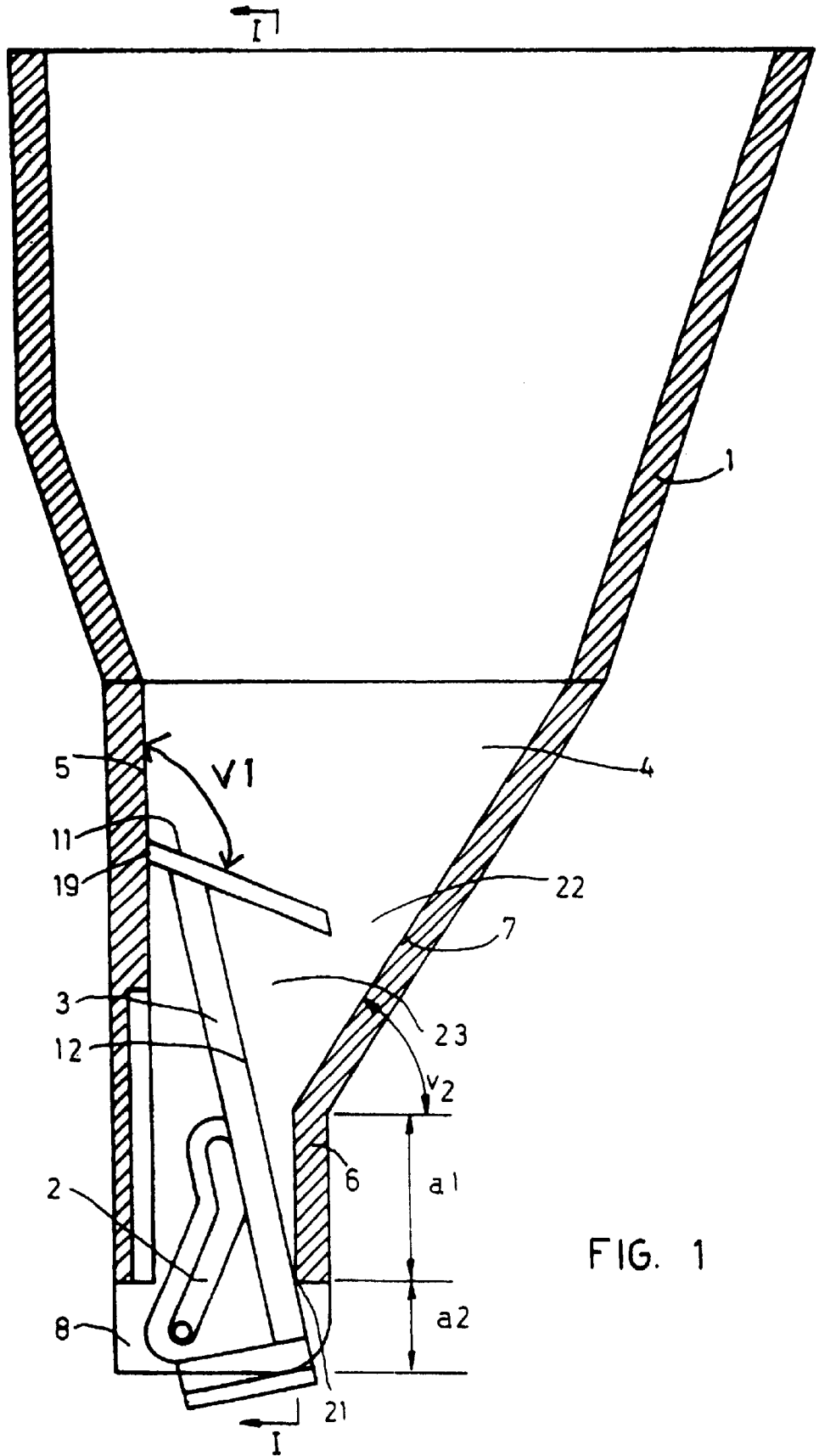
FIG. 1 shows a cross-section through an automatic dispenser according to the invention in which the closing mechanism is in its upper position.
Figure 5:
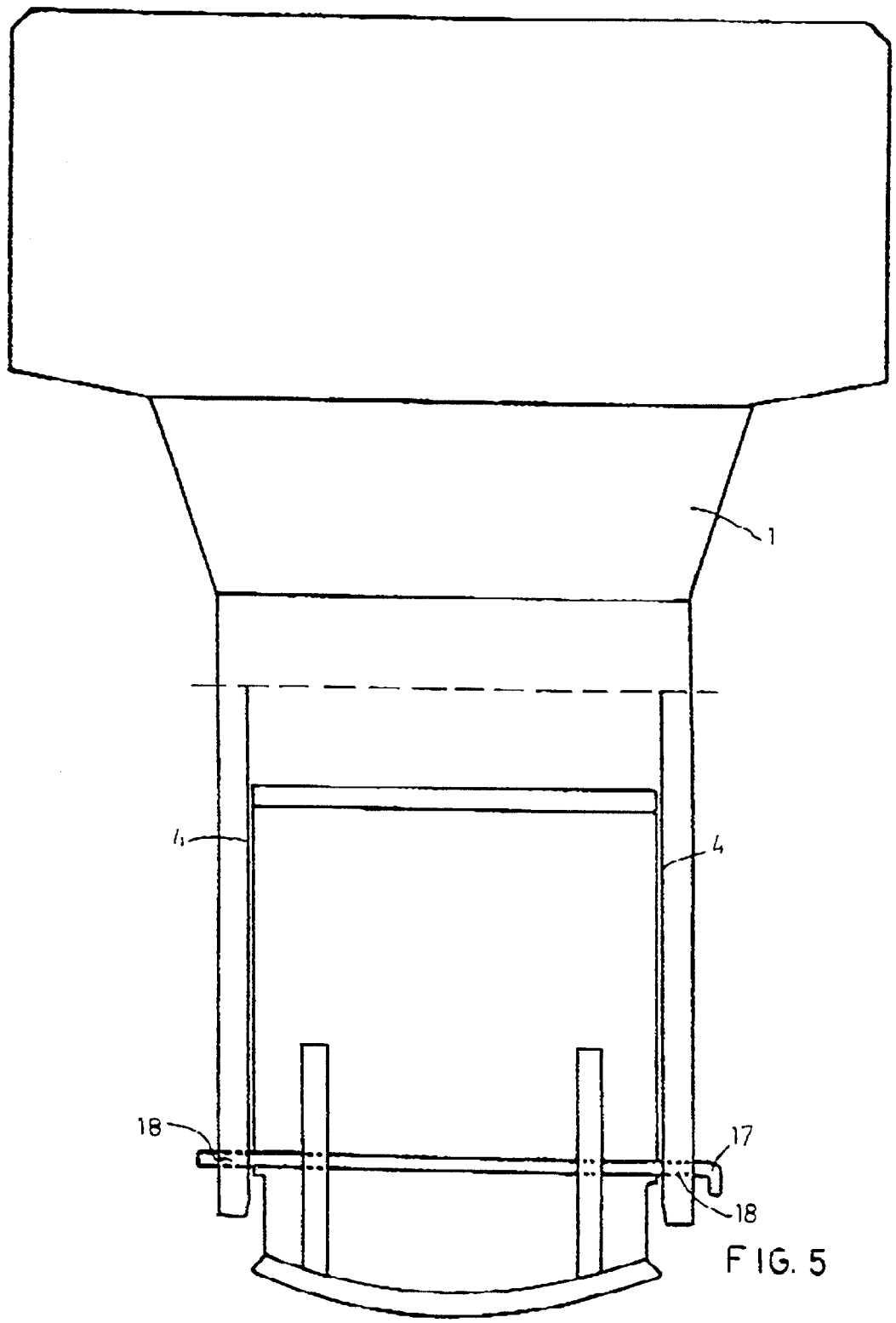
FIG. 5 is a sectional view at I—I in FIG. 1.
Figure 10:
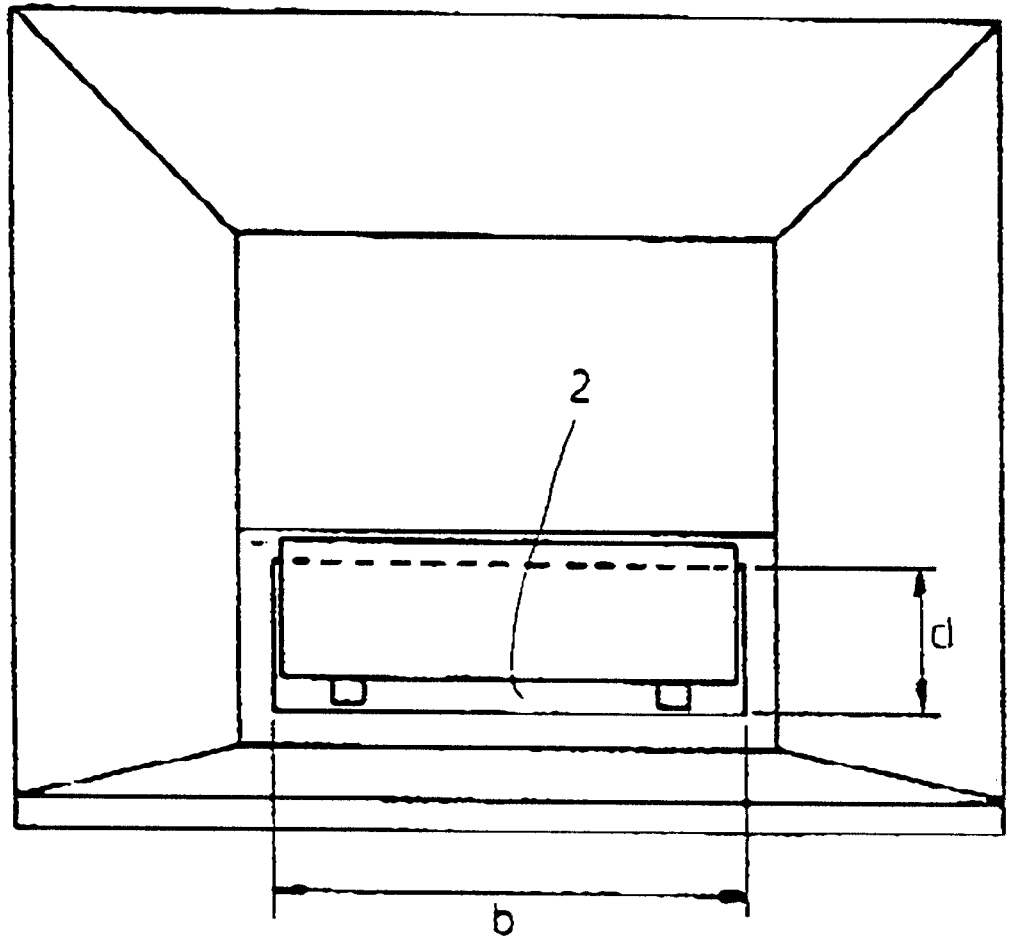
FIG. 10 is a worm's eye view of the automatic dispenser.

According to the invention the lower part of the receptacle 1, which co-operates with the closing mechanism 3, has two vertical side walls 4, FIG. 5, a vertical back wall 5, FIG. 1, and a front wall which at the bottom has a vertical part 6 with a height of a1, which at its top continues as an oblique part 7 at an angle of v2 which is less that 90° to the horizontal. The width b of the outlet opening 2 is preferably larger than the depth d, FIG. 10. Each of the side walls 4 extends at the bottom for a length of a2 below the outlet opening 2, thus forming a lug 8 on each side of the receptacle 1.

Figure 6:
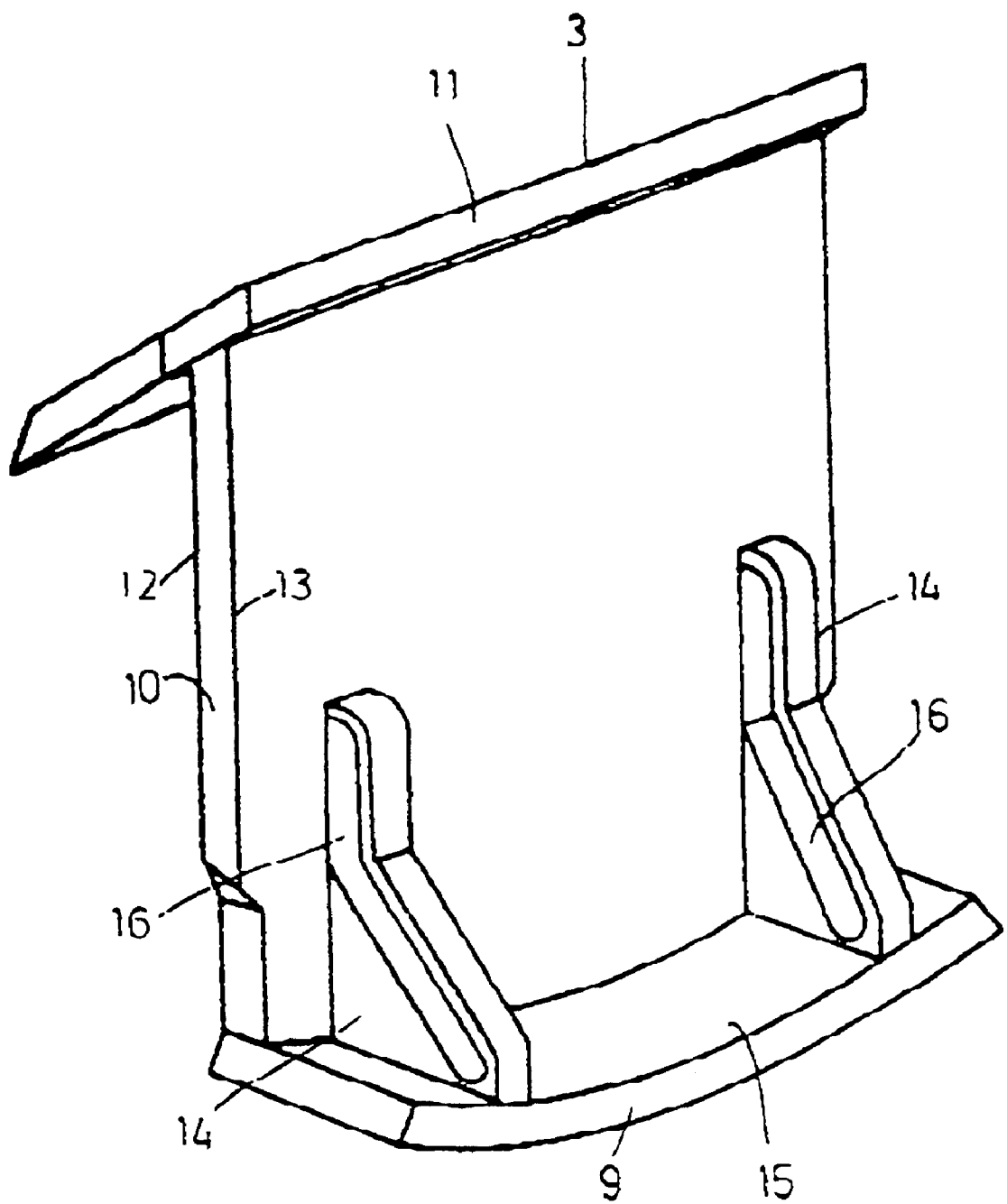
FIG. 6 is a perspective view of a closing mechanism for an automatic dispenser according to the invention.
Figure 7:
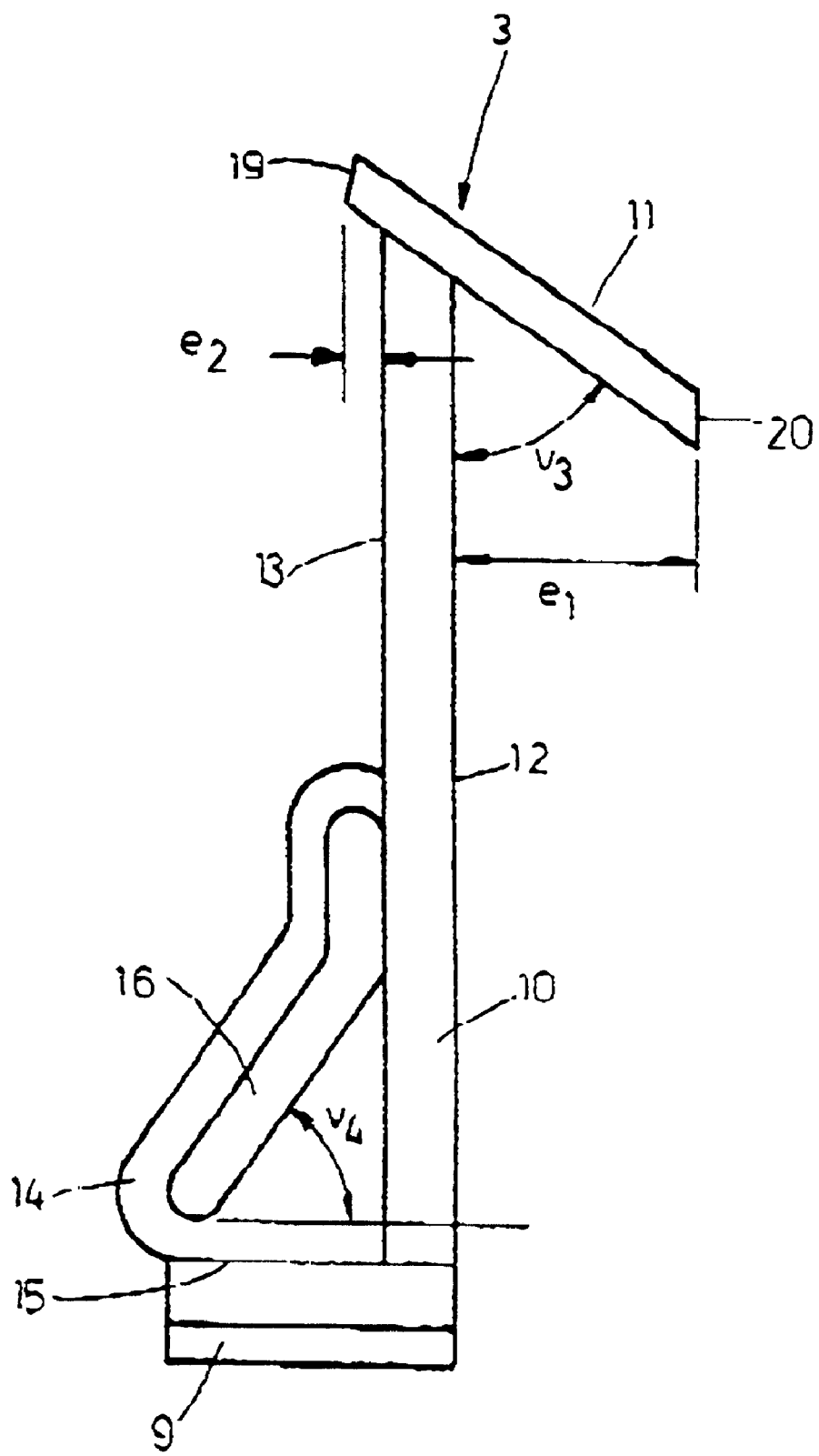
FIG. 7 is a larger scale side view of a closing mechanism.
Figure 9:
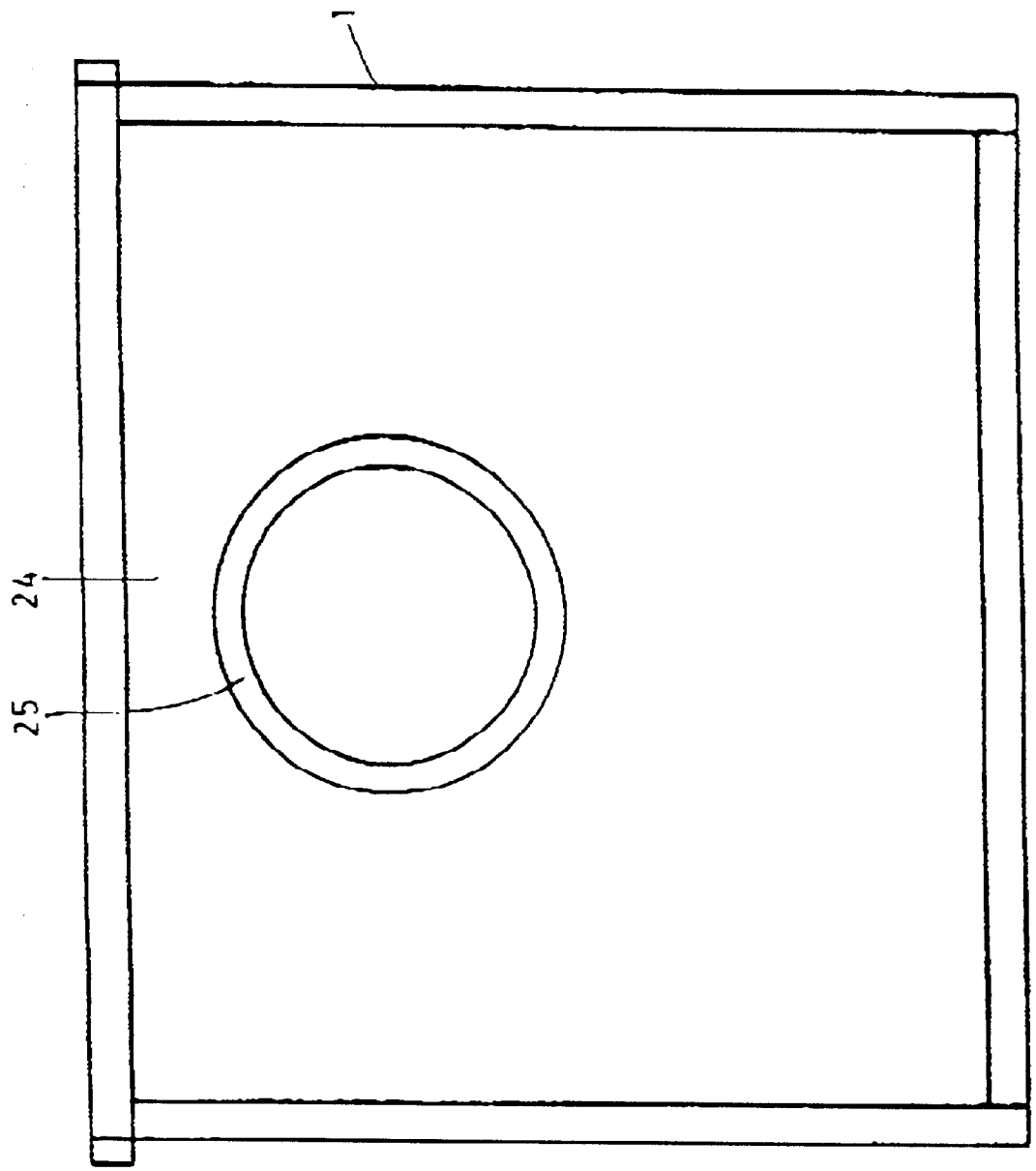
FIG. 9 is a bird's eye view of the automatic dispenser.

As shown in FIGS. 6 and 7 a closing mechanism 3 for an automatic dispenser according to the invention consists, for example, of a curved bottom member 9, which by means of - in its not mounted position - a vertical member 10 is connected to a top plate 11, which forms an angle v3, which preferably is less than 90° to the member 10. The top plate 11 protrudes a distance e1 on the front side 12 of the member 10 and a distance e2 to the rear of the back side 13 of the member 10. The top plate 11 is approximately of the same width as the inside distance b between the two side walls 4 in the receptacle 1.

The closing mechanism 3 is embodied with two supports 14 fastened to the back wall 13 of the member 10 and the upper face 15 of the bottom member 9. Each support 14 is embodied with an oblique guide groove 16, which forms an angle v4, which preferably is less than 90° to the horizontal.

The closing mechanism 3 is mounted in the receptacle 1 by means of a transverse rod 17, which is carried through a hole 18 in each of the lugs 8 on the side walls of the receptacle 1 and the grooves 16 of the supports 14.

The holes 18 are located and the guide grooves shaped and located so that the rear edge 19 and the front edge 20 of the top plate 11 rest against the inside of the back wall 5 and the front wall 7, respectively, in the receptacle 1 when the closing mechanism 3 is in its lower position, and the front side 12 of the member 10 rests against the foremost inside edge 21 of the outlet opening 2, and the rear edge 19 of the top plate 11 rests against the inside of the back wall in the receptacle 1, when the closing mechanism is in its upper position.

Figure 2:
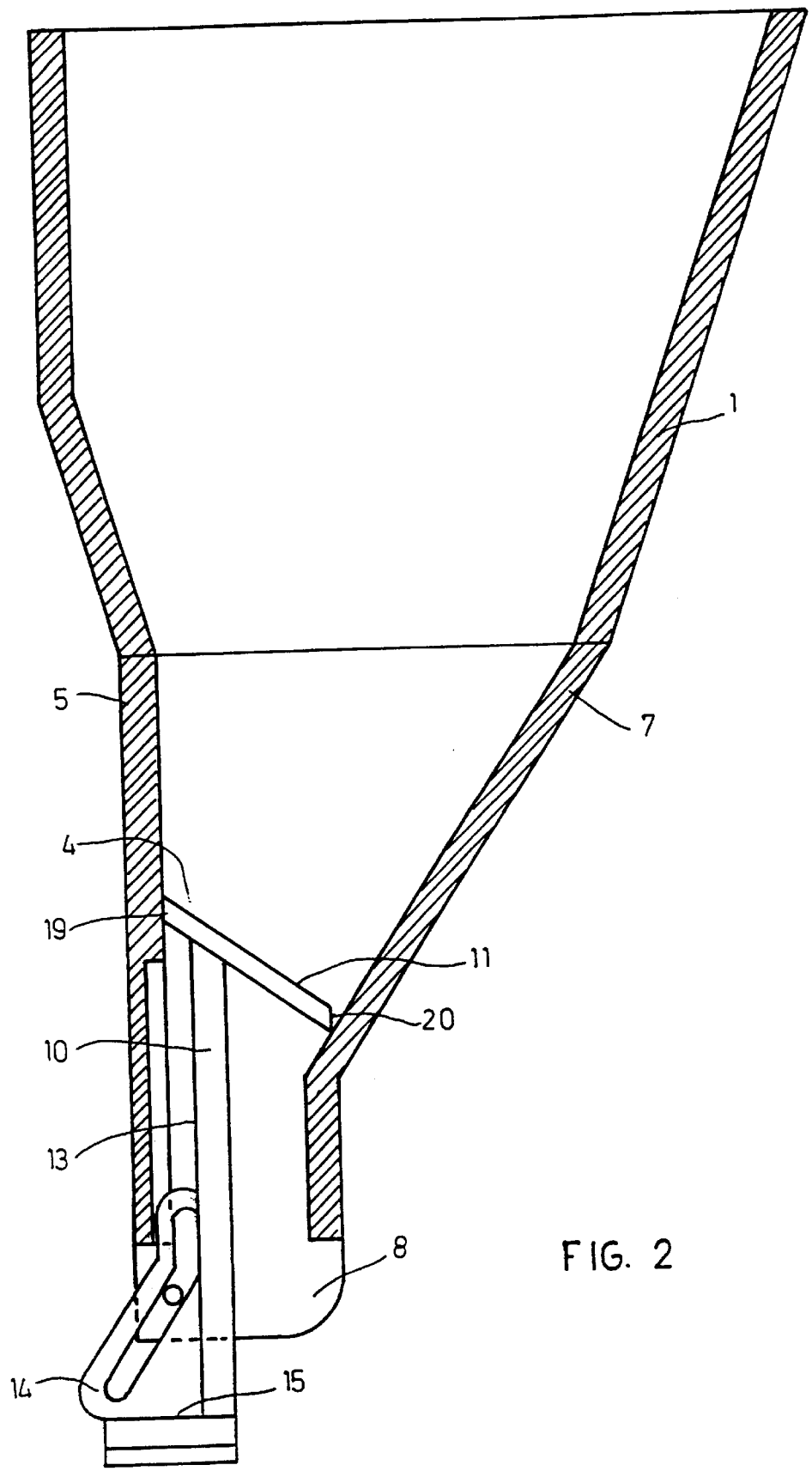
FIG. 2 is an illustration corresponding to the one shown in FIG. 1 in which the closing mechanism is in its lower position, FIG. 3 in an illustration corresponding to the one shown in FIG. 1 in which the closing mechanism is in its midway position.

When the closing mechanism is in its lower position the member 10, as shown in FIG. 2, is approximately vertical, whereby the cross-section of the outlet at the bottom is at least as large as further up.

Figure 3:
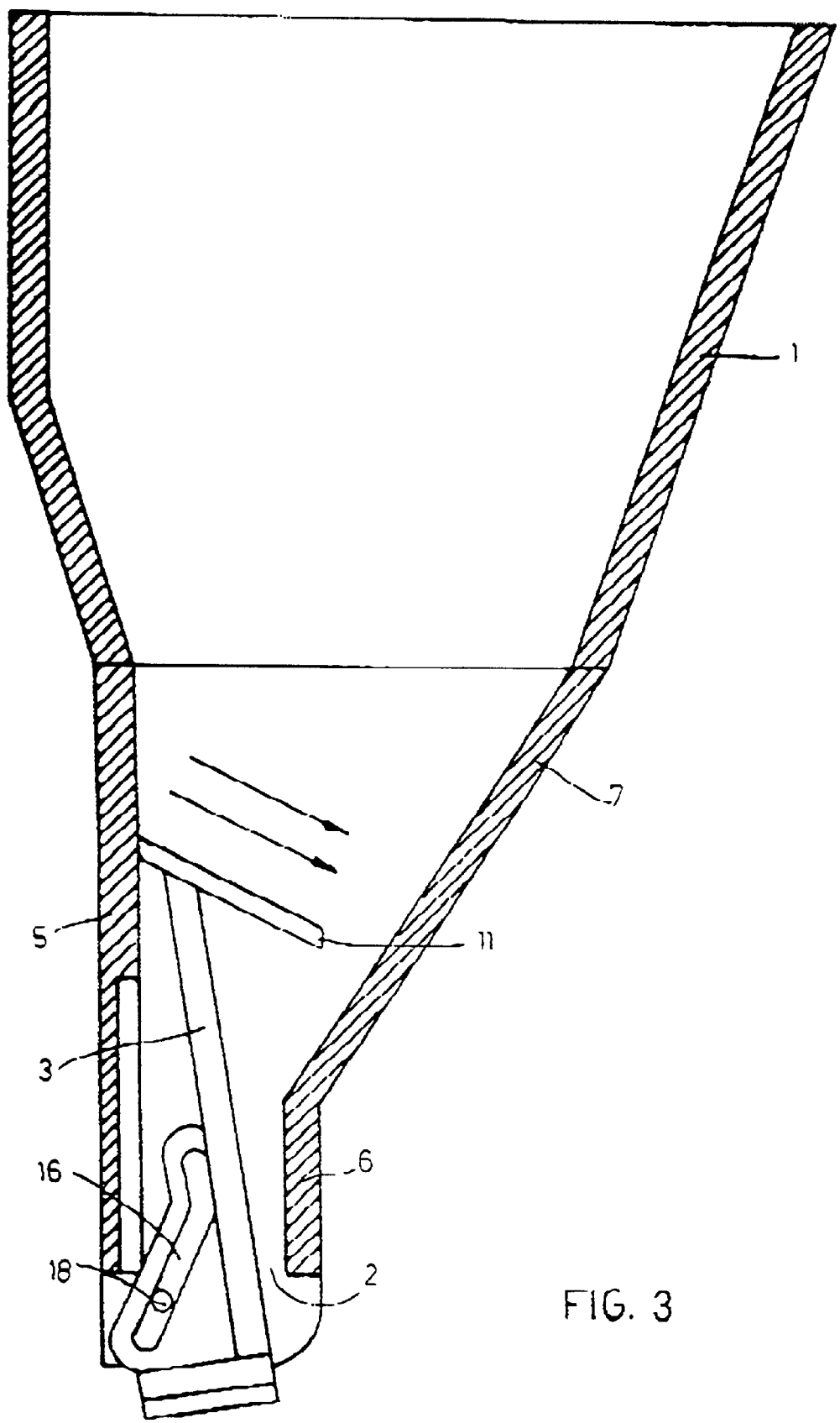

When the closing mechanism 3 is moved upwards the plate 10 will be forced by the overlying fodder in the direction towards the back wall 5 of the receptacle 1 so that the edge 19 of the plate 11 exerts a scraping action on the back wall 5. At the same time the inclination vl of the top plate 11 during the closing action of the closing mechanism is altered. A pumping action then causes the fodder above the plate 11 as shown by arrows in FIG. 3 to be pushed in the direction from the back wall 5 towards the front wall 7. It is therefore always the lowest fodder in the receptacle 1 that is dispensed, and bridging caused by old, thickened fodder is avoided.

When the closing mechanism 3 is in its upper position as shown in FIG. 1 fodder is admitted from the receptacle 1 through a gap 22 between the front edge 20 of the plate 11 and the wall 7 to a space 23 delimited between the front side of the closing mechanism 3 and the walls 4 and 7 of the receptacle 1.

When the closing mechanism 3 is in its lower position as shown in FIG. 2 the quantity of fodder contained in the space 23 is dispensed at the bottom.

Figure 4:
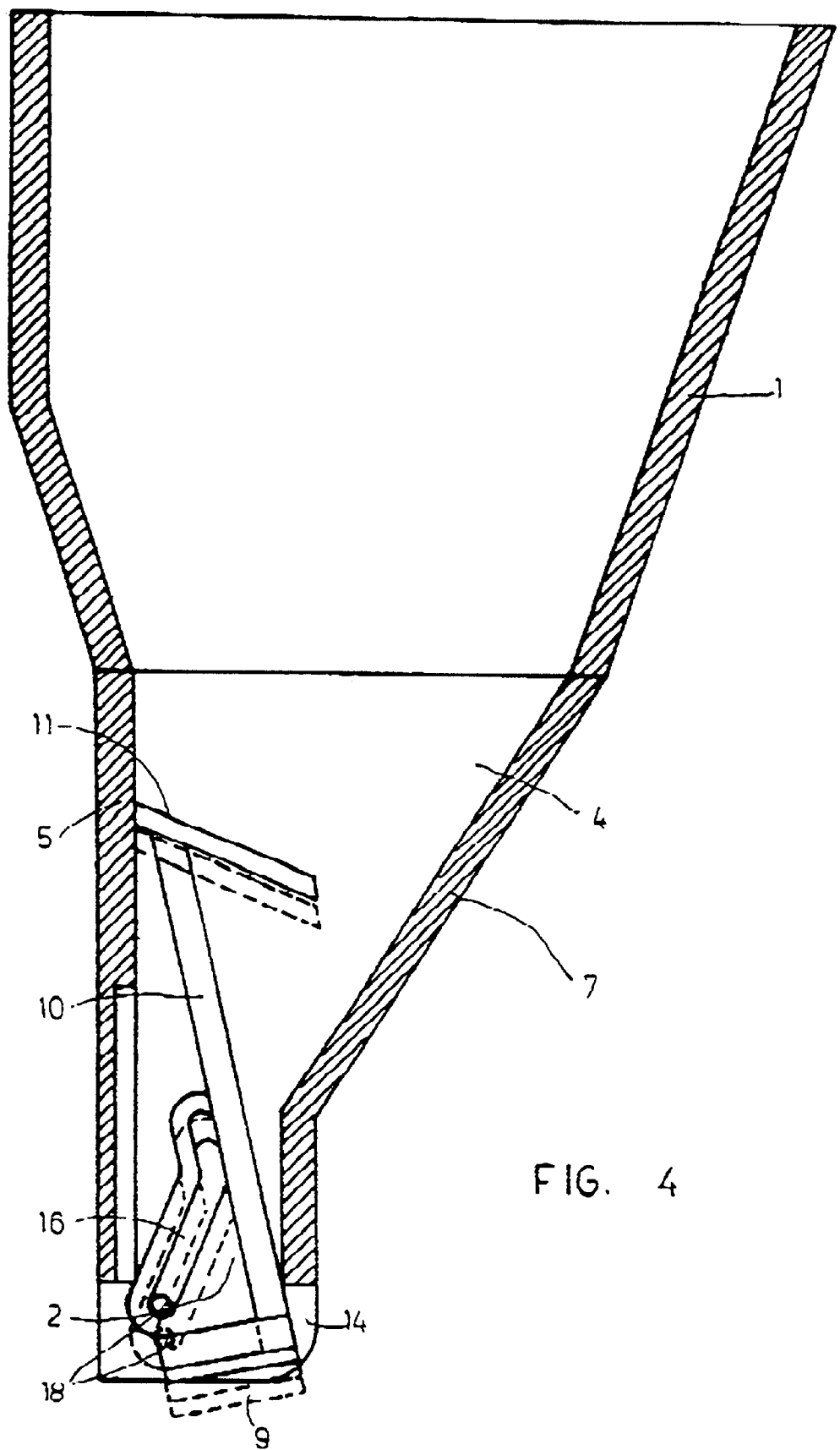
FIG. 4 shows an illustration corresponding to the one shown in FIG. 1 in which the closing mechanism is in its upper position, and where the closing mechanism is mounted in the automatic dispenser's receptacle or house by two different pins.

As shown in FIG. 4 the supports 14 can be embodied with additional holes 18 in a staggered vertical and horizontal direction. The figure shows the position of the closing mechanism fully drawn when the pin 17 is inserted through one hole, and dotted when the pin is inserted through another hole. When the shaft is inserted through another hole, the volume of the space 23 is altered and thus also the dispensed quantity.

Figure 11:
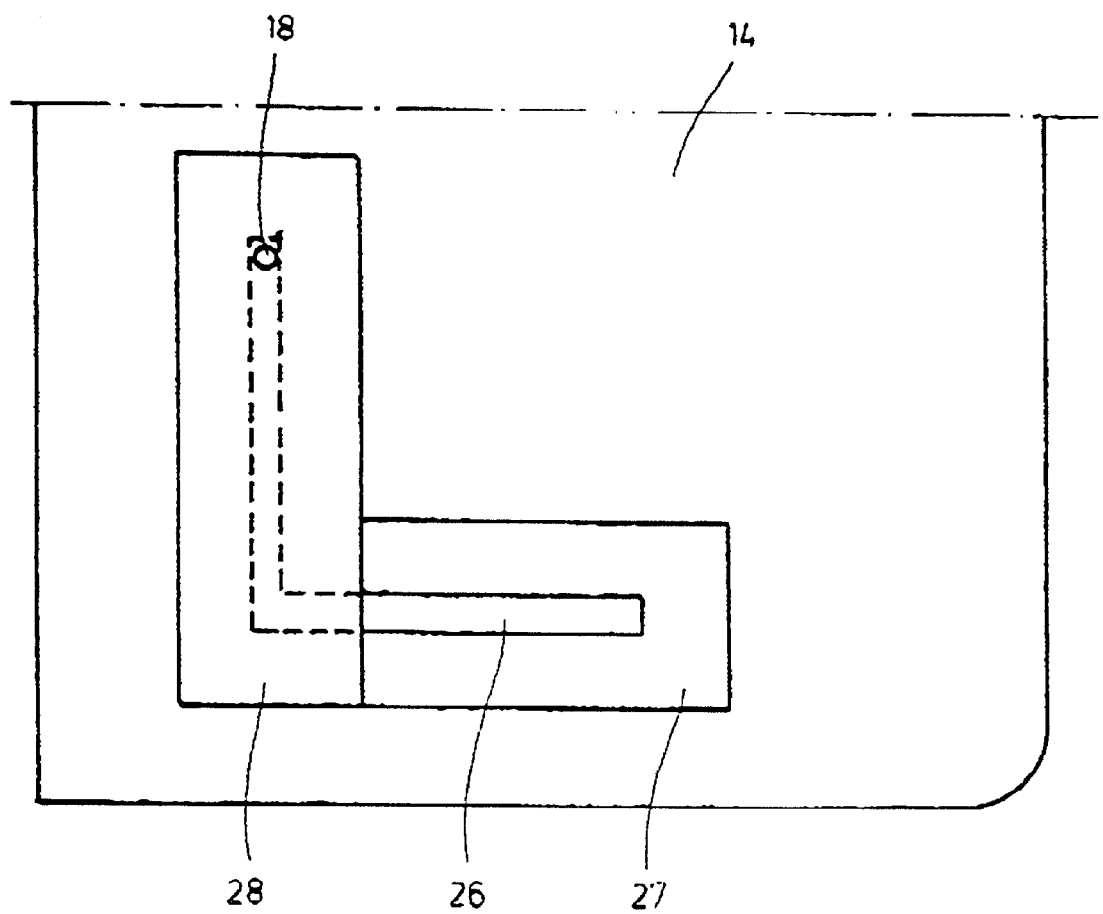
FIG. 11 is a larger scale view of the lower part of an automatic dispenser according to the invention according to an embodiment for the invention.

As shown in FIG. 11 the holes 18 can also be embodied as grooves 26 in the supports 14 and can have the shape of an angle. In an area outside the groove 26 the supports 14 can have a recess 27 into which can be placed a steel plate 18 with a hole 18 opposite the groove. When the plate 28 is laterally reversed or arranged in a horizontal instead of a vertical recess there will be a new hole 18, and consequently an altered quantity is dispensed.

As shown in FIG. 8 the top of the receptacle 1 can be closed by a cover 24. The fodder is charged into the receptacle through a pipe 25 which is taken a short distance h down into the receptacle. This has the effect that an air vacuum is created in the top of the receptacle, whereby the pressure on the closing mechanism is reduced.

The automatic dispenser can be used for the dispensing of material other than fodder.

The shown and described automatic dispenser is only an example serving to illustrate the invention. Within the scope of the invention it is possible to imagine various modifications. For example, the closing mechanism might incorporate springs to activate the closing mechanism in the direction towards an open or closed position.

What is claimed is:

1. An automatic fodder dispenser, comprising:
   a receptacle (1) having an inside, an outside, a back wall and a bottom with an outlet opening (2) having a top and a bottom, and a closing mechanism (3) activateable from outside the dispenser, for selectively closing said outlet opening top and said outlet opening bottom, said closing mechanism being shiftable between an upper position closing the outlet opening bottom and allowing a quantity of fodder to enter a space defined in the closing mechanism, and a lower position closing the outlet opening top and opening the outlet opening bottom whereby fodder in said space is allowed to pass through said outlet opening bottom, the closing mechanism (3) including an oblique top plate (11) with a back edge (19), slidingly engaging against the inner side of the back wall (5) when the closing mechanism (3) is shifted between said first and said second positions, said top plate (11) being inclined relative to the back wall (5) in the receptacle (1) at an angle (v1), said angle (v1) changing as said closing mechanism is shifted from said first position to said second position.

2. Automatic dispenser according to claim 1, wherein the lowest part of the receptacle (1), which cooperates with the closing mechanism (3) has two generally vertical side walls (4), a vertical back wall (5) and a front wall having a vertical bottom portion having a height (a1), and a top portion angled with respect to the horizontal at an angle (v2) of less than 90° so that the receptacle at the bottom has an outlet opening (2) with a square cross-section, and that each of the side walls (4) at the bottom extend a distance (a2) below the outlet opening (2), thus forming a lug (8) on each side of the receptacle (1).

3. Automatic dispenser according to claim 1 wherein the outlet opening (2) includes a width (b) and a depth (d), where the width is larger than the depth (d).

4. Automatic dispenser according to claim 1 wherein the closing mechanism (3) comprises a bottom member (9) connected to a plane top plate (11) by a vertical member (10), which forms an angle (v3), less than 90° to the vertical member (10) and extends a distance (e1) from the front side (12) and a distance (e2) from the backside (13) of the vertical member (10) and has approximately the same width as the inside distance (b) between the side walls (4) of the receptacle (1), and includes two supports (14) attached to the rear wall (13) of the vertical member (10) and to the top side (15) of the bottom member (9), and is embodied with an oblique guide groove (16) forming an angle (v4) to the horizontal of less than 90°.

5. Automatic dispenser according to claim 4, wherein the closing mechanism (3) is mounted in the receptacle (1) by means of a transverse pin (17), which is inserted through a hole (18) in each lug (8) and through a guide groove (16) in each of the supports (14), and that the holes (18) and the guide grooves (16) are so located and shaped that the hindmost (19) and the front edge (20) of the top plate (11) rest against the inside of the back wall (5) and the front wall (7), respectively, of the receptacle (1) when the closing mechanism (3) is in its bottom position, and the front side (12) of a member (10) rests against the foremost internal edge (21) in the outlet opening (2), and the rear edge (19) of the top plate (4) rests against the inside of the back wall (5) in the receptacle (1), when the closing mechanism (3) is in its upper position.

6. Automatic dispenser according to claim 5 wherein the pair of supports (14) are embodied with three holes (18) staggered in relation to each other in the vertical and horizontal directions.

7. Automatic dispenser according to claim 4, wherein the closing mechanism (3) is mounted in the receptacle (1) by means of a transverse pin (17), which is inserted through a hole (18) in each lug (8) and through a guide groove (16) in each of the supports (14), and that the holes (18) and the guide grooves (16) are so located and shaped that the hindmost (19) and the front edge (20) of the top plate (11) rest against the inside of the back wall (5) and the front wall (7), respectively, of the receptacle (2) when the closing mechanism (3) is in its bottom position, and the front side (12) of the member (10) rests against the foremost internal edge (21) in the outlet opening (2), and the rear edge (19) of the top plate 11 rests against the inside of the back wall (5) in the receptacle (1), when the closing mechanism (3) is in its upper position.

8. Automatic dispenser according to claim 7 wherein the supports (14) are embodied with three holes (18) staggered in relation to each other in the vertical and horizontal directions.

9. Automatic dispenser according to claim 1 wherein the closing mechanism (3) further comprises a pair of lugs (8) each mounted on a side wall (4); a pair of supports (14) each having a guide groove (16) therein, said closing mechanism (3) being mounted in the receptacle (1) by means of a transverse pin (17) inserted through a hole (18) in each said pair of lugs (8) and through said guide groove (16) in each of the supports (14), and that the holes (18) and the guide grooves (16) are so located and shaped that the hindmost (19) and the front edge (20) of the top plate (11) rest against the inside of the back wall (5) and the front wall (7), respectively, of the receptacle (1) when the closing mechanism (3) is in its bottom position, and the front side (12) of the member (10) rests against the foremost internal edge (21) in the outlet opening (2), and the rear edge (19) of the top plate (11) rests against the inside of the back wall (5) in the receptacle (1), when the closing mechanism (3) is in its upper position.

10. Automatic dispenser according to claim 9 wherein the pair of supports (14) are embodied with three holes (18) staggered in relation to each other in the vertical and horizontal directions.

11. Automatic dispenser according to claim 1 wherein the receptacle (1) at the top can be closed with a cover (24), and that the material to be dispensed is filled into the receptacle (1) through a pipe (25), which extends a distance (h) down below the underside of the cover (24).

* * * * *